United States Patent [19]

Monroe et al.

[11] Patent Number: 5,131,063
[45] Date of Patent: Jul. 14, 1992

[54] CRIMP AND CLEAVE ASSEMBLY OF AN OPTICAL CONNECTOR

[75] Inventors: Kevin T. Monroe; David D. Erdman; Alan E. Plotts, all of Harrisburg, Pa.

[73] Assignee: AMP Incorporated, Harrisburg, Pa.

[21] Appl. No.: 614,548

[22] Filed: Nov. 16, 1990

[51] Int. Cl.⁵ .............................................. G02B 6/32
[52] U.S. Cl. ...................................... 385/78; 385/53; 385/58
[58] Field of Search ................... 350/96.20, 96.21; 385/53, 58, 60, 76, 77, 78

[56] References Cited

U.S. PATENT DOCUMENTS

| | | | |
|---|---|---|---|
| 4,648,688 | 3/1987 | Ashman et al. | 350/96.18 X |
| 4,679,895 | 7/1987 | Huber | 350/96.20 |
| 4,722,584 | 2/1988 | Kakii et al. | 350/96.20 |
| 4,828,351 | 5/1989 | Beinbaur | 350/96.20 |
| 4,834,487 | 5/1989 | Abendschein et al. | 350/96.20 |
| 4,938,558 | 7/1990 | Miller et al. | 350/96.21 X |
| 4,964,685 | 10/1990 | Savitsky et al. | 385/58 |
| 4,998,795 | 3/1991 | Bowen et al. | 350/96.20 |
| 5,013,124 | 5/1991 | Focht | 350/96.20 X |

OTHER PUBLICATIONS

Photonics Spectra, Feb. 1990, pp. 147, 148, 150.

*Primary Examiner*—Frank Gonzalez
*Assistant Examiner*—Phan T. Heartney
*Attorney, Agent, or Firm*—Gerald K. Kita

[57] ABSTRACT

An optical connector comprising, an alignment ferrule 11 receiving a plunger 38 and receiving an insert 35 between the plunger 38 and a constriction 32, the plunger 38 being constructed to receive an optical fiber 3 and a buffer 4 covering the optical fiber 3, and the plunger 38 and the insert 35 being constructed for movement forwardly to compact the insert 35 in the constriction 32 and to apply compression concentrically on the optical fiber 3.

12 Claims, 5 Drawing Sheets

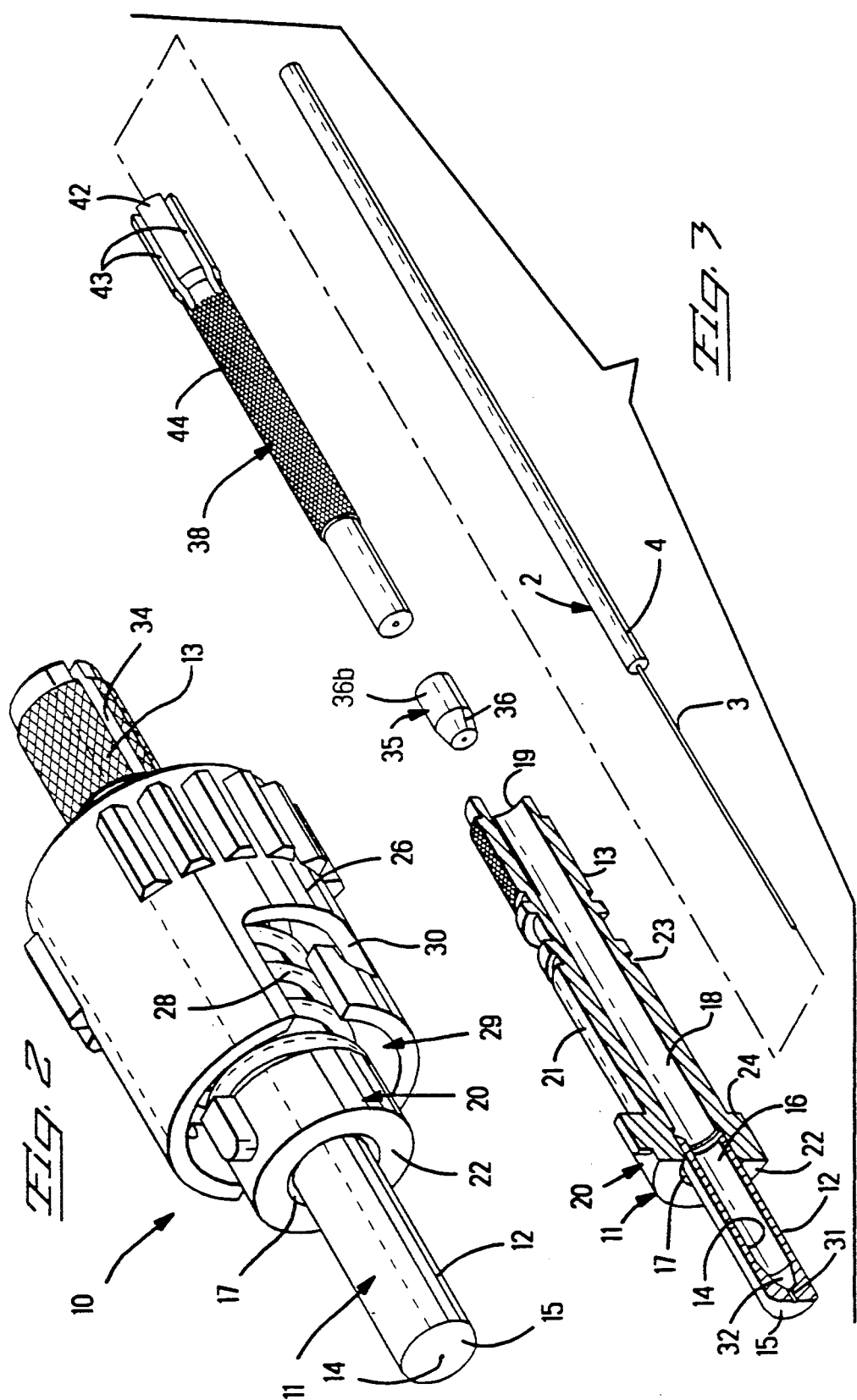

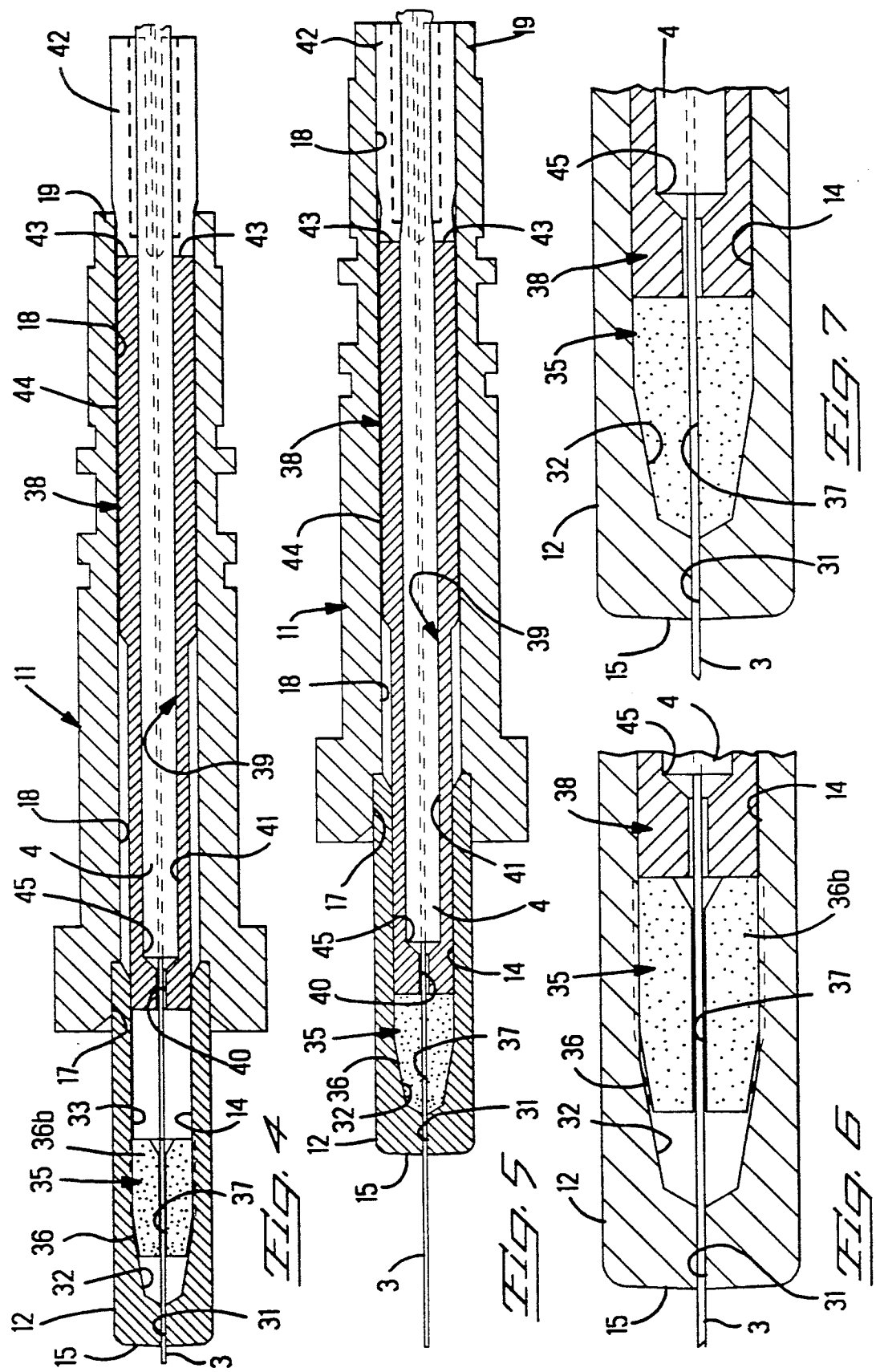

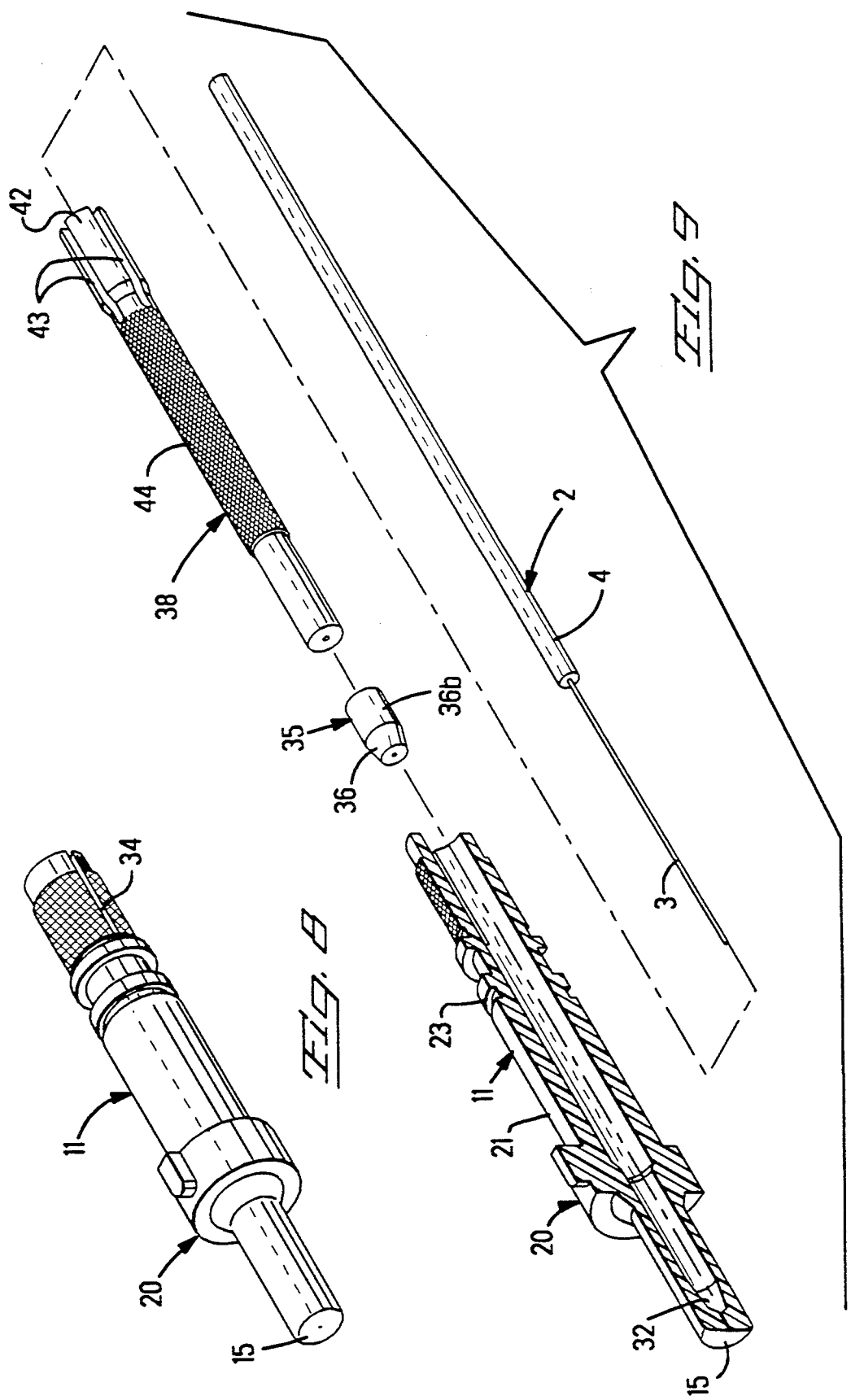

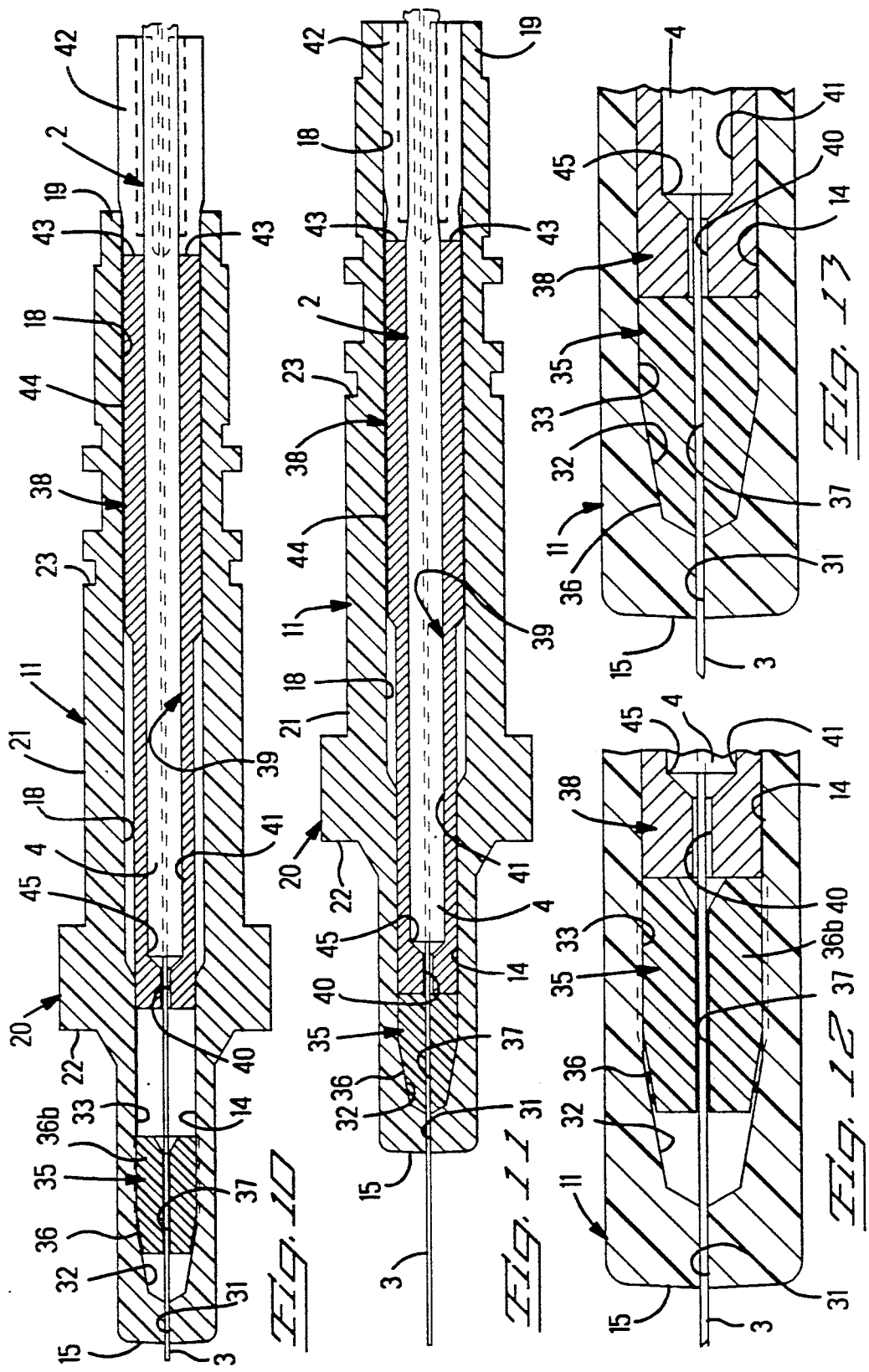

CRIMP AND CLEAVE ASSEMBLY OF AN OPTICAL CONNECTOR

FIELD OF THE INVENTION

The invention relates to an optical connector for an optical fiber cable, particularly an optical connector constructed for assembly with an optical fiber cable without an adhesive.

BACKGROUND OF THE INVENTION

Photonics Spectra, February 1990, Pp. 147, 148, 150, discloses an optical connector having a plunger to force resilient spheres into a constriction within a connector body. The spheres undergo compression and deformation around an optical fiber to clamp the fiber in the connector body. A rear of the plunger clamps radially on a buffer covering the fiber.

A known connector disclosed by U.S. Pat. No. 4,828,351 comprises a hollow connector body, a deformable insert having a central bore for receiving an optical fiber, and the insert is axially forced into a constriction in the hollow connector body to close the sidewall of the bore evenly upon the circumference of the optical fiber, whereby the optical fiber is frictionally retained in the bore and is concentrically aligned within the hollow body, and the insert is frictionally retained in the hollow body.

The known connector of the patent utilizes a cover and a ram tool for driving the cover into an open end of the hollow body. The cover and the ram enter the hollow body to drive the insert into the constriction. The ram is then withdrawn from the hollow body.

SUMMARY OF THE INVENTION

According to the invention, an optical connector includes a plunger for encircling a buffer portion of a buffer covered optical fiber. The plunger is inserted along the interior of a hollow connector body, along with the buffer covered optical fiber and a bare portion of the optical fiber encircled by a deformable insert.

An advantage of the invention resides in the plunger that remains in the hollow connector body to constrain the buffer covered optical fiber from bending, thereby avoiding attenuation of optical signals at a bend in the optical fiber.

Another advantage of the invention resides in a frictional surface of the plunger force fit in the alignment ferrule to restrain the plunger from movement before an optical fiber is received by the plunger and the deformable insert.

Another advantage of the invention resides in an assembled optical connector having a deformable insert and a plunger held by a force fit in an alignment ferrule prior to receiving a buffer covered optical fiber in the connector.

For an understanding of the invention, reference will now be made by way of example to a following detailed description in conjunction with accompanying drawings.

DESCRIPTION OF THE DRAWINGS

According to the drawings,

FIG. 2 is a perspective view of a connector with a precision alignment ferrule;

FIG. 3 is a perspective view of a cable and parts of the connector shown in FIG. 2;

FIGS. 4 and 5 are elevation views in section of a cable and the connector as shown in FIGS. 2 and 3;

FIGS. 6 and 7 are enlarged fragmentary views of portions of the FIGS. 4 and 5;

FIG. 8 is a perspective view of a portion of the connector as shown in FIG. 1;

FIG. 9 is a perspective view of a cable and parts of the connector shown in FIG. 1;

FIGS. 10 and 11 are elevation views in section of a cable and the connector as shown in FIGS. 1, 8 and 9; and FIGS. 12 and 13 are enlarged fragmentary views of portions of the FIGS. 10 and 11.

DETAILED DESCRIPTION

Figure 1:
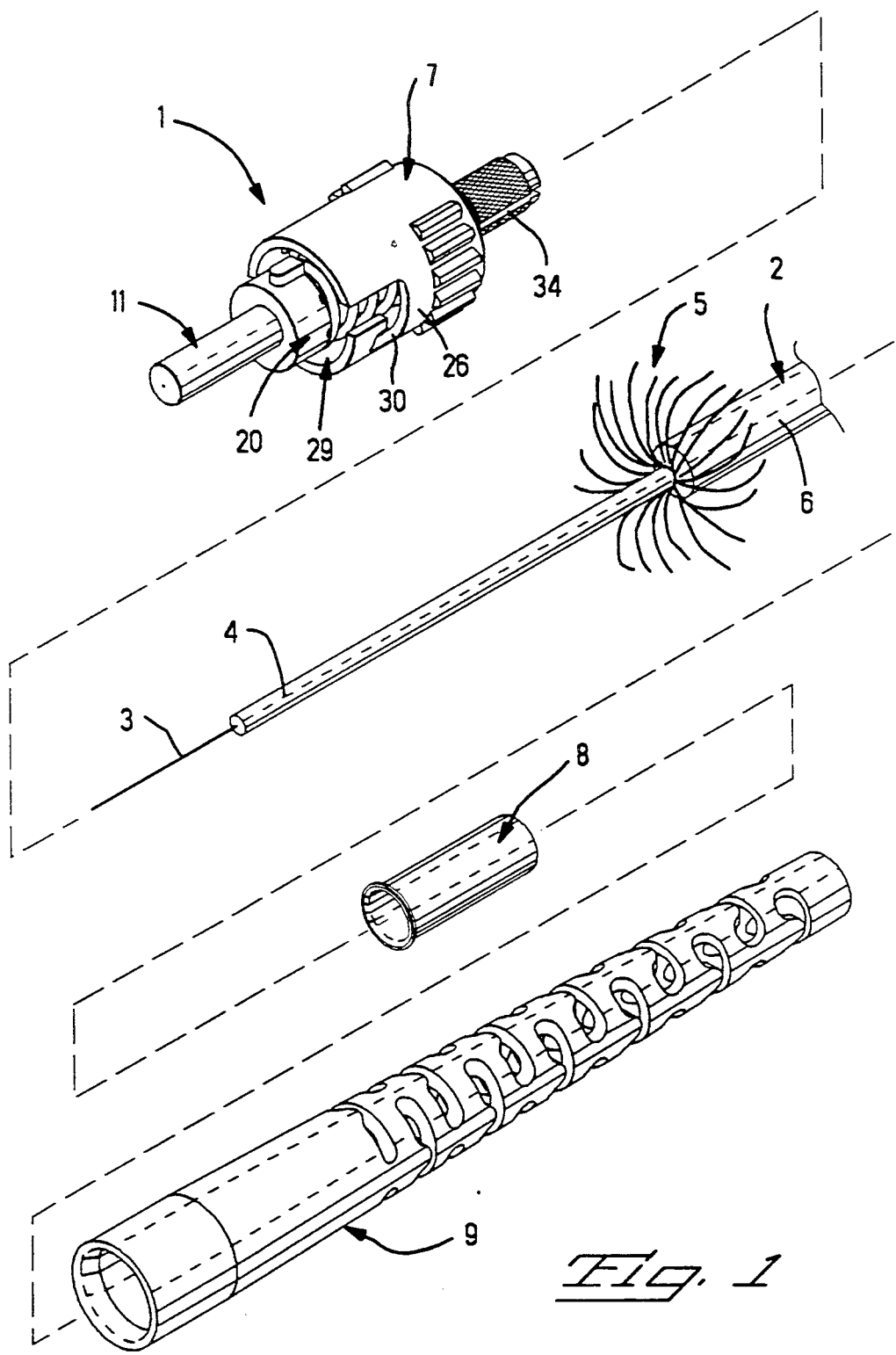
FIG. 1 is a fragmentary perspective view of a connector together with an optical fiber cable, a crimp sleeve and a strain relief depicted in exploded configuration.

With reference to FIGS. 1, 8 and 9, there is depicted, by way of example, a connector 1 for an optical fiber cable 2. The cable 2 includes an elongated central optical fiber 3 concentrically encircled by a buffer 4 together comprising a buffer covered fiber 3, 4. The cable 2 includes a load bearing portion in the form of elongated strength members 5 that extend axially along the cable 2. The strength members 5 are distributed over the outer diameter of the buffer covered fiber 3, 4. The cable 2 further includes an outer jacket 6 of polymeric material enclosing the strength members 5. Parts of the cable 2 are cut away as shown to provide a length of fiber 3 projecting from the buffer 4, and a length of the buffer covered fiber 3, 4 projecting from the strength members 5, and lengths of the strength members 5 projecting from the jacket 6.

The connector 1 includes an optical connector assembly 7 and a crimp ferrule 8. A tubular strain relief boot 9 also is shown. A variation of the connector 1 is shown in FIGS. 2 and 3 as a connector 10, with parts numbered the same as for similar parts of the connector 1. The connector 10 includes a rigid alignment ferrule 11 having a front portion 12 and a rear portion 13. The front portion 12 has an axial, central passage 14, of which a fiber receiving portion 31 extends concentrically with a front end 15 of the front portion 12 for aligning the optical fiber 3 of the cable 2. A rear 16 of the front portion 12 is mounted in a socket 17 of the rear portion 13. The rear portion 13 has an axial passage 18 aligned with the passage 14 and emerging from a rear end 19 of the alignment ferrule 11 for connection to the cable 2.

The alignment ferrule 11 includes, a radially enlarged collar 20 on the rear portion 13 and surrounding the ferrule 11, a stepped cylindrical surface 21 of the ferrule 13 intersecting a transverse front face 22 of the collar 20, and a circumferential groove 23 spaced from a transverse rear face 24 of the collar 20.

According to U.S. Pat. No. 4,834,487, the connector assembly 7 further includes, a snap ring mounted in the groove 23, a coupling nut 26 moveable axially over the alignment ferrule 11 and having a transverse radially projecting, inner flange encircling the alignment ferrule 11 forwardly of the snap ring, a coil spring 28 for compression directly in engagement against the rear face 24 of the collar 20 and for urging a force of compression against the inner flange of the coupling nut 26. The coupling nut 26 has bayonet type slots 30 for connection with a known complementary connector, not shown.

The front portion 12 of the alignment ferrule 11 is a separate part to enable its manufacture with carefully controlled dimensional accuracy. For example, a ceramic material such as alumina will provide a front portion 12 with low dimensional tolerances, and a low thermal expansion coefficient. A metal or plastic front portion 12 requires a high precision, machining operation to obtain concentricity of the passage 14. The rear portion 13 can be manufactured at reduced cost, for example, by using a less costly material and less costly, manufacturing operations than that required by the front portion 12.

Portions of the passage 14 will now be discussed with reference to the front portion 12. With reference to FIGS. 4 and 5, a central, fiber receiving portion 31, sized to receive the optical fiber 3 and concentric with the front end 15, extends and communicates with a tapered portion 32 that is tapered at about 55 degrees or greater, that, in turn, communicates with a cylindrical portion 33. The socket 17 in the rear portion 13 communicates with the passage 18. Multiple longitudinal slits, one shown in FIG. 2 at 34, extend through the rear 16 and forwardly and communicate with the passage 18.

With reference to FIGS. 3 through 7, shown is an insert 35 of a known powdered metal, of the type useful to form a solid object by compressing the powdered metal to a desired shape, followed by sintering. According to the invention, the insert 35 is formed to a desired shape, but is not sintered. The insert 35 is shaped by compressing the powdered metal with about forty per cent of the total compression recommended as a prerequisite to sintering. The insert 35 is constructed to be further compacted, as will be described. The insert 35 has a frustoconical front 36 unitary with a cylindrical rear 36b, and has a concentric, fiber receiving bore 37. The unsintered insert 35 is inserted into the passages 18 and 14 until the frustoconical front 36 of the insert 35 is registered against the tapered portion 32 of the passage 14. Therein, the insert 35 is protected from breakage by the ferrule 11. Due to the relatively low mass of the insert 35, it is not easily dislodged or fractured by rough handling.

With reference to FIGS. 3 through 7, a plunger 38 having a stepped outer diameter, and has a passage 39, with a reduced diameter, fiber receiving portion 40 at a front end, communicating with a buffer receiving portion 41 communicating with a rear end 42 of the plunger 38. The plunger 38 can be unitary or constructed of more than one piece. Multiple slits 43, FIG. 3, extend longitudinally through the plunger rear end 42. The rear end 42 is thicker and is larger in external diameter than the intermediate diameter. Forwardly of the slits 41, the larger, intermediate diameter exterior of the plunger 38 is provided with a frictional surface 44, for example, knurling. The plunger 38 is assembled part of the way along the passage 18, FIG. 4, in tandem with and behind the insert 35, with the slits 41 and the rear end 42 protruding from the rear end 19 of the alignment ferrule 11, and with the frictional surface 44 retained with a force fit, frictionally against the interior side of the passage 18 to restrain the plunger 38 from movement. This is further advantageous, should the plunger 38 be made of more than one piece, the separate pieces of the plunger 38 can be located in tandem within the passage 18, and the force fit will prevent the separate pieces from falling out of the passage 18. In addition, the enlarged rear end 42 is wedged against the entrance of the passage 18. The insert 35 is retained between a constriction, provided by the tapered portion 32, and the plunger 38 substantially without compression. Thereby, the connector 10 is partially assembled and is ready for shipment to a user of the connector 10.

With reference to FIGS. 1, 10 and 11, a unitary alignment ferrule 11, manufactured as described in U.S. Pat. No. 4,834,487, is manufactured with less stringent dimensional accuracy than that required by the separate portion 12 as shown in the patent. The unitary alignment ferrule 11 is provided with a front end 15, a radially enlarged collar 20 with a transverse front face 22, a projecting alignment key and a transverse rear face 24. A remainder of the alignment ferrule 11 is provided with a circumferential groove 23 for receiving a snap ring, not shown, that projects radially outward from the remainder of the alignment ferrule 11. The alignment ferrule 11 includes a stepped cylindrical surface 21 that extends from the front end 15, intersects the front face 22 of the collar 20, and extends to the rear face 24 of the collar 20 and to a rear end 19.

With reference to FIGS. 1 and 10 through 13, portions of the passage 14 will now be discussed with reference to the unitary ferrule 11. A central, fiber receiving portion 31, sized to receive slidably the optical fiber 3, and being concentric with the front end 15, communicates with a tapered portion 32 communicating with a cylindrical portion 33, in turn, being continuous with the passage 18 extending to the rear end 19. Multiple, longitudinal slits 34, one shown in FIGS. 1 and 8, extend through the rear end 19 and forwardly and communicate with the passage 18.

With reference to FIGS. 9 through 13, an insert 35 is formed from a molded plastic material with a frustoconical front 36 and a cylindrical rear 36b and a concentric fiber receiving bore 37. The insert 35 is assembled into the unitary ferrule 11. The insert 35 is inserted into the passage 18 and then into the passage 14 from the rear, and is positioned with its frustoconical front 36 within the tapered portion 32. A plunger 38, as previously described, is inserted into the passage 18 and is in tandem with the insert 35 and is restrained by a force fit of the surface 44 against the side of the passage 18. Thereby, the connector 1 is substantially similar to the connector 10, is partially assembled and is ready for shipping to a user of the connector 1. It is to be understood that the connector 1 and the connector 10 can use any of the inserts 35, and that connectors, different from the connectors 1 and 10 can also be adapted with the feature described, and are intended to be covered by the invention.

In use of the connector 1 or 10, the strain relief boot 9 and the crimp ferrule 8 are assembled slidably over and along the cable 2, not shown. The optical fiber 3 and the buffer covered fiber 3,4 of the cable 2 are inserted along the passage 39 of the plunger 38 until the optical fiber 3 projects forwardly and projects successively along and through the fiber receiving portion 40 of the plunger 38 and the bore 37 of the insert 35 and the fiber receiving portion 31 of the passage 14. Movement of the cable 2 forwardly continues until, both the optical fiber 3 emerges from the passage portion 31 at the front end 15, and the buffer covered fiber 3,4 becomes stopped by the intersection 45 of the stepped diameters of the passage 39. Then the cable 2 and the plunger 38 are moved together as a unit forwardly of the alignment ferrule 11, by applying force to the rear end 42 of the plunger 38. Thereby, the protruding rear end 42 of the plunger 38 becomes assembled in the passage 18, with the rear end 42 being radially contracted and being force fit in the passage 18, and with the rear end 42 and the rear end 19 of the alignment ferrule 11 being concentrically aligned.

The plunger 38, with its forward movement, urges the optical fiber 3 further along the fiber receiving portion 31 of the passage 14, and urges the insert 35 forwardly within the passage 14. The plunger 38 compresses the insert 35 within a constriction provided by the tapered portion 32 of the passage 14. The insert 35 is compacted concentrically in the constriction, causing a further reduction in volume of the insert 35 and a concentric reduction in the diameter of the bore 37, which applies a concentric grip on the optical fiber 3, whereby the optical fiber 3 is forced into concentric alignment with the portion 31 of the passage 14 and is concentrically restrained from radial movement by the applied grip. With respect to the insert 35 of powdered metal, the insert must be retained under compression to prevent shape distortion thereof. With respect to the insert 35 of plastic material, the insert 35 must be retained under compression to prevent resilient expansion of the material. The corresponding insert 35 is retained under compression by restraining the plunger 38 from further movement. For example, the knurled exterior friction surface 44 of the plunger 39 is moved forwardly along the passage 18 to become force fit immoveably in a new location, to be followed by assembly of the crimp ferrule 8, as will now be described.

The strength members 5 are positioned to overlap a knurled exterior of the rear 16 of the alignment ferrule 11, as disclosed in U.S. Pat. No. 4,834,487. The crimp ferrule 8 is moved along the cable 2 to clamp the strength members 5 against the exterior of the rear 16 of the alignment ferrule. The crimp ferrule 8 forms a radial constriction into which is received the rear 16. The slits 34 in the alignment ferrule 11 and the slits 41 in the plunger 38 permit the alignment ferrule 11 and the plunger 38 to collapse concentrically, applying compression concentrically against each other and against the buffer covered fiber 3,4, to restrain relative movement of parts with respect to the alignment ferrule 11. Especially, the parts are constrained from movement, thus, to maintain the insert 35 under compression to prevent a loosening of the grip on the optical fiber 3.

To complete the assembly, the strain relief boot 9 is moved along the cable 2 to encircle the crimp ferrule 8, and to be mounted to the alignment ferrule 11, and may interlock with the alignment ferrule 11. The strain relief boot 9 extends along apart of the cable 2 that projects from the end of the plunger and the rear end 19 of the alignment ferrule 11. The part of the optical fiber 3 that projects forward of the front end 15 is cut off, and the end surface of the optical fiber 3 is provided with an optical face by fracturing or by polishing.

We claim:

1. An optical connector comprising:
   an alignment ferrule having a passage receiving a plunger and receiving an insert between the plunger and a constriction of the passage, the plunger being constructed to receive an optical fiber and a buffer covering the optical fiber, and the plunger and the insert being constructed for movement forwardly of the passage to compact the insert in the constriction and to apply compression concentrically on the optical fiber, and means restraining the plunger from movement to retain the insert under compression.

2. An optical connector as recited in claim 1, wherein said means includes, longitudinal slits in a rear end of the plunger and in a rear end of the alignment ferrule and a crimp ferrule for radial compression of the rear end of the plunger and the rear end of the alignment ferrule.

3. An optical connector as recited in claim 1, comprising:
   the plunger is held in the alignment ferrule with the plunger projecting from a rear end of the alignment ferrule prior to receiving the optical fiber.

4. An optical connector as recited in claim 1, comprising:
   the insert being unitary with a fiber receiving bore.

5. An optical connector as recited in claim 1, comprising:
   a strain relief boot mounted to the alignment ferrule.

6. An optical connector as recited in claim 1, comprising:
   a frictional surface on the outer surface of the plunger force fit in the alignment ferrule.

7. An optical connector as recited in claim 1, comprising:
   the insert being formed of unsintered powdered metal compacted by a fraction of the total compaction required for sintering the powdered metal.

8. An optical connector as recited in claim 1, comprising:
   the plunger being in tandem with the insert.

9. An optical connector as recited in claim 1, comprising:
   the insert is retained between the plunger and the constriction substantially without axial compression prior to the plunger receiving the buffer covered optical fiber.

10. A method of assembling an optical connector with a buffer covered optical fiber, comprising the steps of:
    assembling a deformable insert and a plunger in a passage of an alignment ferrule of an optical connector, with the insert being retained between a constriction of the passage and the plunger substantially without compression,
    retaining the plunger with a force fit in the passage,
    assembling a buffer covered optical fiber in the plunger, with the optical fiber projecting through the insert and through a front end of the alignment ferrule,
    moving the plunger and the buffer covered optical fiber forwardly with respect to the alignment ferrule,
    compressing the insert in the constriction and compressing the insert concentrically on the optical fiber,
    restraining the plunger from further movement to retain the insert under compression, and
    finishing the optical fiber with an optical face.

11. A method as recited in claim 10, and further comprising the steps of: securing strength members surrounding the buffer covered optical fiber to the alignment ferrule.

12. A method as recited in claim 10, and further including the step of:
    radially collapsing the rear ends of the alignment ferrule and the plunger toward the buffer covered optical fiber.

* * * * *